United States Patent [19]

Hopwood

[11] 3,927,287
[45] Dec. 16, 1975

[54] SENSOR UNIT

[76] Inventor: Charles E. Hopwood, 1108 Sunnydale Drive, Clearwater, Fla. 33515

[22] Filed: Aug. 2, 1974

[21] Appl. No.: 489,516

Related U.S. Application Data

[63] Continuation-in-part of Ser. No. 344,196, March 23, 1973, Pat. No. 3,846,748.

[52] U.S. Cl. ............................. 200/61.47; 200/224
[51] Int. Cl.² .................. H01H 29/20; H01H 35/14
[58] Field of Search ....... 200/61.45 R, 61.47, 61.52, 200/199, 214–220, 224, 230; 340/52 H, 71

[56] References Cited
UNITED STATES PATENTS

| | | | |
|---|---|---|---|
| 2,307,441 | 1/1943 | Wyman | 200/61.47 |
| 2,573,479 | 10/1951 | McNerney | 200/230 X |
| 2,849,550 | 8/1958 | Olmer et al. | 200/224 X |
| 3,497,950 | 3/1970 | Squire et al. | 200/61.52 UX |
| 3,499,131 | 3/1970 | Gutting | 200/224 X |
| 3,660,840 | 5/1972 | Plofchan | 340/52 H UX |
| 3,671,933 | 6/1972 | Barnes | 200/61.45 R X |
| 3,846,748 | 11/1974 | Hopwood | 200/61.47 X |

*Primary Examiner*—James R. Scott
*Attorney, Agent, or Firm*—Robert F. Ruemeli

[57] ABSTRACT

A sensor unit, for actuating signals indicating a change of velocity of an automobile, or other vehicle, includes a container of liquid fixedly mounted on the vehicle. A sensor is substantially immersed in the liquid and is mounted for swinging movement in the container so as to remain in a generally horizontal position as the inclination of the container changes upon the vehicle going up or down hills or the like. A buoyant member of the sensor is mounted in the liquid above the pivotal axis and a mercury switch having sets of contacts at either end is below the buoyant member. These contacts are connected to signals for indicating acceleration and deceleration of the vehicle. To facilitate centering of the sensor unit when as is installed on the vehicle, the top of the container includes a concavity for receiving a centering bubble.

16 Claims, 5 Drawing Figures

SENSOR UNIT

This application is a Continuation-In-Part of my copending application, Ser. No. 344,196, filed Mar. 23, 1973, now U.S. Pat. No. 3,846,748 granted Nov. 5, 1974.

This invention relates to a sensor unit and, more particularly, to such a unit for operating signals indicating a change in velocity of a vehicle.

BACKGROUND OF THE INVENTION

Various systems are known for indicating when an automobile or other vehicle is accelerating or decelerating. Some of these systems also indicate the rate at which the vehicle is changing velocity. Other systems also indicate when the vehicle is traveling at substantially constant velocity.

These known systems generally perform adequately when the vehicle is moving on level ground, but when the vehicle is going up or down hills the systems are generally inaccurate in indicating the vehicle's change in velocity, or are very sluggish in operation. Most of these systems rely on an inertia responsive switch, often in the form of a mercury switch. So long as the switch remains horizontal it can be expected to adequately indicate acceleration or deceleration of the vehicle. A pendulum, or similar device, has been utilized to retain the switch in a generally horizontal position. Such devices tend to oscillate and in general are inadequate for their intended function. Mercury switches are available with longitudinally arched tubes so that the mass of mercury is retained between the ends of the tube and must move upwardly along the curvature of the tube in order to engage contacts at the tube end. The curvature of the tube tends to compensate for inclination of the vehicle but still is generally inadequate in producing consistent signal operation.

It is a primary object of this invention to provide a new and useful sensor unit for indicating a change in velocity of a vehicle. A related object is provision in such a unit of a member received in a liquid for retaining a swingably mounted sensor in horizontal position as the inclination of the vehicle varies. Another related object is provision of such a member which is buoyant in the liquid and is above a swinging axis of the sensor.

Another object is provision of a new and useful sensor unit for actuating a signal responsive to a change in velocity of a vehicle, the sensor unit including a body adapted to be operatively fixed to the vehicle and having a container of liquid with a sensor mounted in the liquid for swinging movement so as to remain substantially level as the inclination of the container varies, the sensor being connected for operating the signal responsive to a change in velocity of the vehicle. A related object is provision of such a sensor having a buoyant member received in the liquid above the swinging axis of the sensor to retain the sensor level. Another related object is provision of an inertia responsive signal operating switch proximate the swinging axis. A further related object is provision of a centering concavity in an upper portion of the container for receiving a leveling bubble during installation on the vehicle.

The invention, in brief, is directed to a sensor unit for actuating signals indicating acceleration or deceleration of a vehicle. In order to provide accurate operation of the sensor unit, a signal actuating switch is maintained in a generally horizontal position as the vehicle moves up and down hills, or the like, by means of a member swingably mounted in a body of liquid and above the switch.

These and other objects and advantages of the invention will be apparent from the following description and the accompanying drawing.

DESCRIPTION OF THE ILLUSTRATED EMBODIMENT

Figure 1:
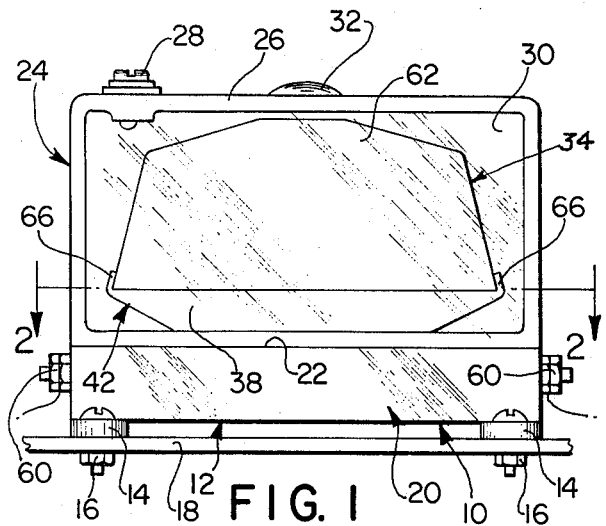
FIG. 1 is a schematic, side view of a preferred embodiment of the sensor unit.

Referring to the drawing, the sensor unit 10 has a body 12 with feet 14 having apertures receiving suitable fasteners such as nuts and bolts 16 for securing the unit to a rigid supporting member 18 of a vehicle, or the like. Body 12 is in the form of a sealed container 19 including an opaque base 20 from which the feet 14 extend. A continous shoulder 22 about the upper portion of the base 20 receives a transparent cover 24 suitably sealingly secured to the base along the shoulder 22, as by an adhesive, or the like. An upper wall 26 of the cover 24 carries a threaded plug 28 for filling the container with a suitable liquid such as oil 30.

An upwardly extending concavity 32 is generally centered between opposite ends of the upper wall 26 and in cooperation with the oil 30 receives an air bubble for leveling the body 10 when it is installed on the vehicle support 18.

Figure 4:
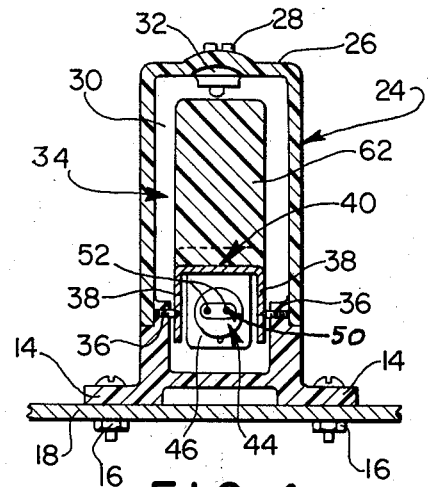
FIG. 4 is a schematic, vertical sectional view taken generally along the line 4—4 in FIG. 3.

A sensor 34 is substantially immersed in the oil 30 and is pivotally mounted on the base 20 for swinging movement about a generally horizontal axis, and as shown best in FIG. 4, a pair of cone point bolts 36 are threaded into the base 20 at the shoulder 22 with their pointed ends received in commplementary cavities in depending legs 38 of a generally inverted U-shaped portion 40 of a frame 42. Outer ends of the cone point bolts 38 are sealed in the base 20 by the adhesive securing the cover 24 to the base, the lower end portion of the cover overlying the outer ends of the bolt 36.

Figure 3:
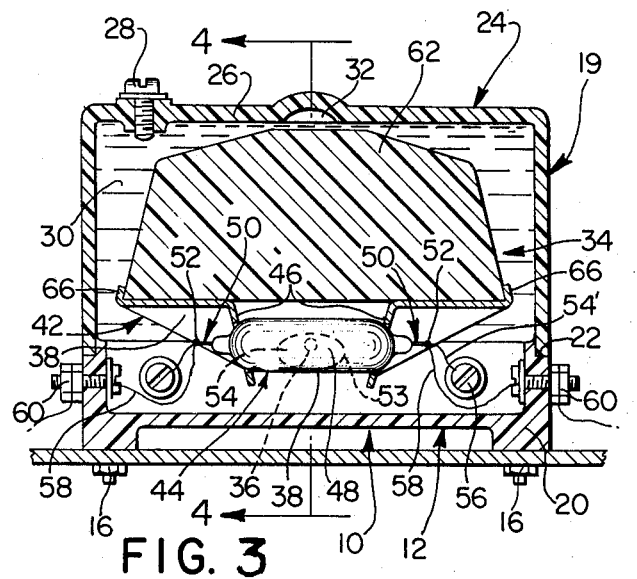
FIG. 3 is a schematic, sectional side view taken generally along the line 3—3 in FIG. 2.
Figure 2:
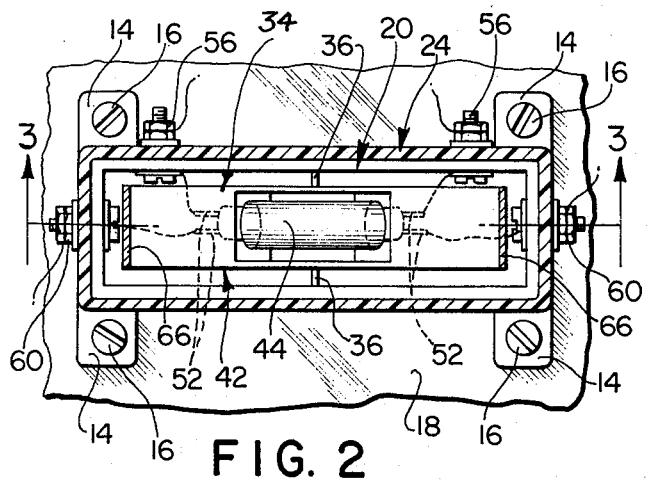
FIG. 2 is a schematic, sectional top view taken generally along the line 2—2 in FIG. 1.

Control means in the form of a switch 44 is fixedly mounted on the frame 42. More particularly, opposite ends of the switch 44 are seated in apertures in depending legs 46 (FIG. 2) of the frame, the legs 46 being generally normal to the legs 38. As illustrated herein, the switch 44 is in the form of a suitable mercury switch such as a Gordos mercury switch, in which the path of a body of mercury within a sealed tube may descend from contacts at opposite ends of the tube to an intermediate portion of the tube, so that the mercury is normally in a position intermediate the ends of the tube. In brief, illustrated switch 44 has an elongated tube sealed at opposite ends which are received in apertures in the legs 46, each end carrying a set 50 (FIGS. 3–5) of spaced apart contacts 52 (FIGS. 2 and 4) inner ends of the contacts of each set being positioned to be selectively engaged by a mass of mercury 54 within the tube 48, to place the set of contacts in circuit. One of the contacts 52 of each set 50 is connected by a very flexible conductor 54' with a terminal 56 sealingly extending through and fixed to a side wall of the base 20 for connection with a source of electrical power, the other contact 52 being connected by a very flexible conductor 58 with a similar terminal 60 for connection with a device to be selectively connected in circuit, such as a signal light (not shown). Thus, as the mass of mercury 54 moves from a longitudinally centered position, as shown by dotted lines in FIG. 3, to either end of the tube 48, it engages the inner ends of the set of contacts 52 at that end to place these contacts in circuit for actuating the associated signal, as will be more fully described later.

The switch 44 is retained in generally horizontal position by a buoyant member 62, preferably an expanded plastic such as rigid urethane foam, for example, which is impenetrable to the oil 30. This buoyant member 62 is mounted atop the frame 42 and is held in place by tabs 66 at opposite ends of the frame. The center of buoyancy of the member 62 is well above the horizontal pivotal axis of rotation of the sensor 34, as defined by the cone point bolts 36, and is preferably of sufficient buoyancy in the oil 30 that the sensor 34 exerts practically no force on the bolts 36 but rather floats in the oil.

The sensor unit 10 is secured to the suport 18, and is positioned with the longitudinal axis of the tube 48 aligned with the length of the vehicle and normal to the swinging axis of the switch 44 as defined by the cone point bolts 36.

The sensor unit 10 is first leveled by means of shims, or the like, between the legs 14 and the support 18 until the bubble is centered in the concavity 32, with the vehicle standing on substantially level ground, and is secured in place by the nuts and bolts 16. The terminals 56 are connected with the electrical supply circuit of the vehicle and the terminals 60 are each connected with one of the associated signals such as amber and green signal lights for indicating when the vehicle is decelerating and accelerating, respectively. When the vehicle is accelerating, inertia of the mass of mercury 53 causes it to move to the rear contact set 50, and upon deceleration to move to the forward contact set 50.

Figure 5:
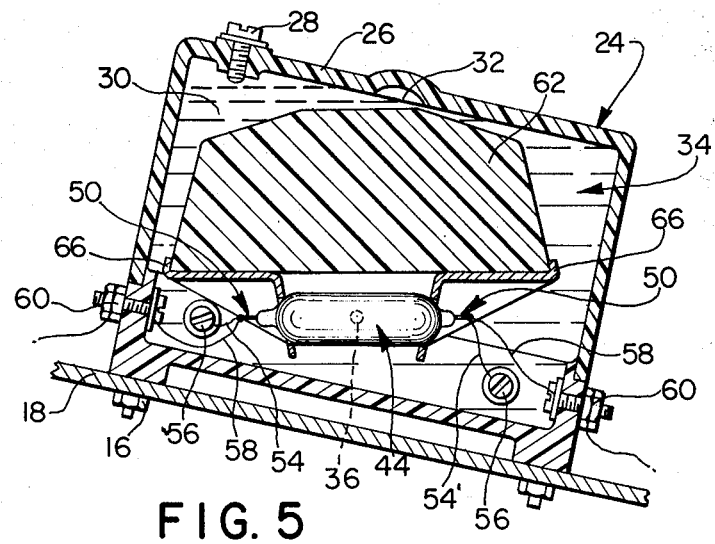
FIG. 5 is a schematic, sectional side view, generally similar to FIG. 3, but with the sensor unit in an inclined position.

While the vehicle is moving on a substantially level ground, the sensor unit will remain substantially in a position as shown in FIGS. 1–4. However, when the vehicle is moving up or down an incline, the body 12 of the sensor unit will be inclined along with the vehicle, for example as shown in FIG. 5. In order to maintain the sensor unit 10 functioning normally for actuating the signal lights upon acceleration or deceleration of the vehicle, the sensor 34 must be kept generally horizontal and to this end the buoyant member 62 retains the longitudinal axis of the tube 48 generally level as the oil 30 moves slowly passed the buoyant member 62 and the sensor 34 continues to float in the oil.

While this invention has been described with reference to a particular embodiment in a particular environment, various changes may be apparent to one skilled in the art and the invention is therefore not to be limited to such embodiment or enviornment, except as set forth in the appended claims.

What is claimed is:

1. In a signal system for a vehicle, a sensor unit for actuating a signal responsive to movement of the vehicle, the sensor unit comprising, a body adapted to be operatively fixed to the vehicle and including a container, a liquid in said container, a substantially rigid sensor effectively completely immersed in said liquid and mounted on said body for swinging movement about a generally level axis to permit relative movement between the sensor and said body, said sensor including control means comprising an inertia responsive mercury switch adapted to be connected with a source of electrical power and the signal and operable between a normal first position and a second position for operating the signal, said switch having an elongated sealed tube with its longitudinal axis generally horizontally disposed and having a set of spaced apart contacts at one end and flexible conductors, one for each of said contacts and connecting the associated contact with an associated one of terminals extending outwardly from said container, said control means being mounted substantially level with said generally level axis and operable from the first position to the second position responsive to a change of velocity of the vehicle, and said sensor further including retaining means above said axis and retaining said control means in substantially said first position as said body moves relative to said sensor, the retaining means including a member substantially impenetrable to and buoyant in said liquid.

2. A unit as set forth in claim 1 in which said container has a centering concavity for cooperation with the liquid in positioning a centering bubble when leveling the body.

3. A unit as set forth in claim 1 in which the buoyant member is an expanded plastic.

4. A unit as set forth in claim 1 in which said switch is inertia responsive for operation between said positions.

5. A unit as set forth in claim 4 in which the switch includes a second said set of contacts at an opposite end of said tube, and a generally horizontal diameter of said tube substantially midway between said ends being generally co-axial with the generally level axis.

6. A unit as set forth in claim 5 in which said container is sealed to retain the liquid therein and has a centering concavity in an upper portion for cooperation with the liquid in positioning a centering bubble when leveling the body.

7. A unit as set forth in claim 6 in which the sensor is sufficiently buoyant in said liquid that the sensor exerts substantially no load on said generally level axis.

8. A unit as set forth in claim 1 in which the sensor is sufficiently buoyant in said liquid that the sensor exerts substantially no load on said generally level axis.

9. In a signal system for a vehicle, a sensor unit for actuating a signal responsive to movement of the vehicle, the sensor unit comprising, a body adapted to be operatively fixed to the vehicle and including a container and a liquid in said container, said container having a centering concavity for cooperation with the liquid in positioning a centering bubble when leveling the body, a sensor substantially immersed in said liquid and mounted on said body for swinging movement about a generally level axis to permit relative movement between the sensor and said body, said sensor including control means adapted to be connected with a source of electrical power and the signal and operable between a normal first position and a second position for operating the signal, said control means being mounted substantially level with said generally level axis and operable from the first position to the second position responsive to a change of velocity of the vehicle, and said sensor further including retaining means above said axis and retaining said control means in substantially said first position as said body moves relative to said sensor.

10. A unit as set forth in claim 9 in which the retaining means includes a member buoyant in said liquid.

11. A unit as set forth in claim 10 in which said switch is inertia responsive for operation between said positions.

12. A unit as set forth in claim 11 in which said sensor is a substantially rigid unit and is effectively completely immersed in said liquid, said member is an expanded plastic substantially impenetrable to said liquid, said switch is a mercury switch having an elongated sealed tube with its longitudinal axis generally horizontally disposed and having a set of spaced apart contacts at one end and flexible conductors, one for each of said contacts and connecting the associated contact with an associated one of terminals extending outwardly from said container.

13. A unit as set forth in claim 12 in which the switch includes a second said set of contacts at an opposite end of said tube, and a generally horizontal diameter of said tube substantially midway between said ends being generally co-axial with the generally level axis.

14. A unit as set forth in claim 13 in which said container is sealed to retain the liquid therein.

15. A unit as set forth in claim 14 in which the sensor is sufficiently buoyant in said liquid that the sensor exerts substantially no load on said generally level axis.

16. A unit as set forth in claim 9 in which the sensor is sufficiently buoyant in said liquid that the sensor exerts substantially no load on said generally level axis.

* * * * *